(12) United States Patent
Yao et al.

(10) Patent No.: US 10,522,875 B2
(45) Date of Patent: Dec. 31, 2019

(54) LEAD-ACID BATTERIES WITH FAST CHARGE ACCEPTANCE

(71) Applicant: University of Houston System, Houston, TX (US)

(72) Inventors: Yan Yao, Pearland, TX (US); Yanliang Liang, Houston, TX (US); Saman Gheytani, Houston, TX (US); Yan Jing, Houston, TX (US)

(73) Assignee: UNIVERSITY OF HOUSTON SYSTEM, Houston, TX (US)

( * ) Notice: Subject to any disclaimer, the term of this patent is extended or adjusted under 35 U.S.C. 154(b) by 119 days.

(21) Appl. No.: 15/571,324

(22) PCT Filed: May 20, 2016

(86) PCT No.: PCT/US2016/033575
§ 371 (c)(1),
(2) Date: Nov. 2, 2017

(87) PCT Pub. No.: WO2016/191292
PCT Pub. Date: Dec. 1, 2016

(65) Prior Publication Data
US 2018/0301763 A1 Oct. 18, 2018

Related U.S. Application Data

(60) Provisional application No. 62/165,377, filed on May 22, 2015.

(51) Int. Cl.
*H01M 10/12* (2006.01)
*H01M 4/60* (2006.01)
(Continued)

(52) U.S. Cl.
CPC ............. *H01M 10/12* (2013.01); *B60L 53/11* (2019.02); *H01M 4/14* (2013.01); *H01M 4/602* (2013.01);
(Continued)

(58) Field of Classification Search
CPC ........ H01M 10/12; H01M 10/08; H01M 4/14; H01M 10/44; H01M 4/602; H01M 10/06;
(Continued)

(56) References Cited

U.S. PATENT DOCUMENTS 4,092,463 A * 5/1978 Wurmb .................. H01M 4/14
429/105
6,248,474 B1 6/2001 Nishiyama et al.
(Continued)

FOREIGN PATENT DOCUMENTS

JP 06-056989 3/1994
JP 10-294107 11/1998
(Continued)

OTHER PUBLICATIONS

Le Comte. Anna I G. Simpler and greener grafting method for improving the stability of anthraquinone-modified carbon electrode in alkaline media. Electrochimica Acta. Aug. 10, 2014, vol. 137, pp. 447-453.
(Continued)

*Primary Examiner* — Michael L Dignan
(74) *Attorney, Agent, or Firm* — Winstead PC

(57) ABSTRACT

An improved lead acid battery (LAB) battery may provide high charge acceptance and may be suitable for a wide range of applications, including a variety of new applications. The new battery can sustain 67% of the maximum capacity even at a very high charging rate of 10C. This battery may decrease the use of lead in comparison to prior lead acid battery designs by up to 50%.

21 Claims, 12 Drawing Sheets

(51) Int. Cl.
*H01M 10/06* (2006.01)
*H01M 4/14* (2006.01)
*H01M 10/08* (2006.01)
*H01M 10/44* (2006.01)
*B60L 53/10* (2019.01)

(52) U.S. Cl.
CPC ........... *H01M 4/608* (2013.01); *H01M 10/06* (2013.01); *H01M 10/08* (2013.01); *H01M 10/44* (2013.01); *H01M 4/606* (2013.01); *H01M 2220/20* (2013.01); *Y02E 60/126* (2013.01); *Y02T 10/7016* (2013.01)

(58) Field of Classification Search
CPC .. H01M 4/608; H01M 2220/20; H01M 4/606; B60L 53/11; Y02E 60/126; Y02T 10/7016
See application file for complete search history.

(56) References Cited

U.S. PATENT DOCUMENTS

| | | | | |
|---|---|---|---|---|
| 2002/0086203 | A1* | 7/2002 | Nobuta | H01M 4/60 429/101 |
| 2003/0118877 | A1* | 6/2003 | Armand | H01M 4/137 429/321 |
| 2003/0148188 | A1* | 8/2003 | Umemoto | C07D 241/02 429/310 |
| 2007/0172731 | A1* | 7/2007 | Nobuta | H01G 9/155 429/213 |
| 2012/0164539 | A1 | 6/2012 | Zhamu et al. | |
| 2012/0258336 | A1* | 10/2012 | Jun | H01G 11/34 429/7 |
| 2013/0004836 | A1* | 1/2013 | Otsuka | H01M 4/137 429/188 |
| 2014/0308581 | A1 | 10/2014 | Yao et al. | |
| 2014/0363746 | A1 | 12/2014 | He et al. | |
| 2016/0049659 | A1 | 2/2016 | Yao et al. | |
| 2017/0033362 | A1* | 2/2017 | Hara | H01M 4/14 |

FOREIGN PATENT DOCUMENTS

| | | | |
|---|---|---|---|
| JP | 3045750 B2 | 5/2000 | |
| WO | WO2014/164150 | * 10/2014 | ........... H01M 10/05 |
| WO | WO-2014-164150 A1 | 10/2014 | |
| WO | WO-2014-169122 A1 | 10/2014 | |

OTHER PUBLICATIONS

Song, Zhiping. Anthraquinone based polymer as high performance cathode material for rechargeable lithium batteries. Chemical Communications, 2009, Issue 4, pp. 448-450.

Choi, Wonsong, et al., "Aqueous Electrochemistry of Poly(vinylanthraquinone) for Anode-Active Materials in High-Density and Rechargeable Polymer/Air Batteries", dx.doi.org/10.1021/ja206961t|j. Am. Chem. Soc. XXXX, XXX, 000-000, A-E.

Poizot, Philippe et al., "Clean Energy New Deal for a Sustainable World: From Non-CO2 Generating Energy Sources to Greener Electrochemical Storage Devices," Energy & Environmental Science, 2011 vol. 4, No. 6, pp. 2003-2019.

* cited by examiner

LEAD-ACID BATTERIES WITH FAST CHARGE ACCEPTANCE

RELATED APPLICATIONS

This application claims the benefit of U.S. Provisional Patent Application No. 62/165,377 filed on May 22, 2015, which is incorporated herein by reference.

FIELD OF THE INVENTION

This invention relates to lead acid batteries (LABs). More particularly, to LABs with improved electrodes and charge acceptance.

BACKGROUND OF INVENTION

The lead acid battery (LAB) industry represents more than $30B in annual sales globally. A common arrangement for LABs is to utilize lead oxide ($PbO_2$) as a cathode, lead as an anode, and 2-8 M sulfuric acid as the electrolyte. Some features of LABs are: high discharge power, excellent high and low temperature operation, ultra-safe, and excellent existing recycling programs that are highly economical. However, LABs may utilize heavy metals that are or may become banned in the future due to toxicity and/or environmental concerns. For example, Europe threatens to extend the ban on heavy metals to lead acid batteries, including those used for vehicles. Further, in some applications, higher charge acceptance than current LABs provide may be desirable. For example, micro hybrid and stop/start technologies require higher charge acceptance that current lead acid battery technology cannot provide.

The charge acceptance problem in LABs is related to the negative electrode. As an example, the mechanism of LABs may include $PbSO_4$ forming large crystals on the negative electrode. This leads to a sulfated negative electrode or a negative electrode that is at a lower state-of-charge than the positive. This failure mechanism is common in start-stop vehicles. Under the high-rate partial state-of-charge conditions that are required by mild/full hybrid electric vehicles, the lead electrode is known to suffer premature capacity loss due to aggressive sulfation at the electrode surface. The use of additives with high surface area alleviates this problem but does not eliminate it. This leads to a sulfated negative electrode or a negative electrode that is at a lower state-of-charge than the positive. This failure mechanism is common in start-stop vehicles.

Lead-carbon (PbC) batteries and UltraBattery® have been developed by several companies to address this challenge, which substitute activated carbon for the lead anode. Charge/discharge cycle testing of these batteries at 1C further confirmed that a standard positive electrode in an LAB could be charged and discharged at high rate. However, the negative electric double-layer capacitor-type electrode in the PbC battery had very low capacity and a capacitive voltage profile (i.e. sloping). Further, these batteries required a complicated negative electrode design that resulted in high resistance preventing adequate current for cold starting of vehicles.

SUMMARY OF INVENTION

A lead-organic (PbOrg) battery is discussed herein, which refers to a lead-acid battery that utilizes at least one organic material as an electrode. In one embodiment, a PbOrg battery may provide ten or more times higher charge acceptance than other lead-acid batteries. The PbOrg battery may provide positive and negative electrodes in an electrolyte. The PbOrg battery may provide an electrode formed with one or more organic materials, such as, but not limited to, organic compounds comprising cyclic substructures with hydroxyl and/or carbonyl groups. The cyclic substructures may be a carbocycle, heterocycle, or aromatic. In some embodiments, the organic compound may be a molecule. In some embodiments, the organic compound may be a coordination polymer. In some embodiments, the organic compound may be a polymer. In some embodiments, the PbOrg battery may decrease the use of lead in comparison to prior lead acid battery designs by 50% or more.

The foregoing has outlined rather broadly various features of the present disclosure in order that the detailed description that follows may be better understood. Additional features and advantages of the disclosure will be described hereinafter.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figure 1:
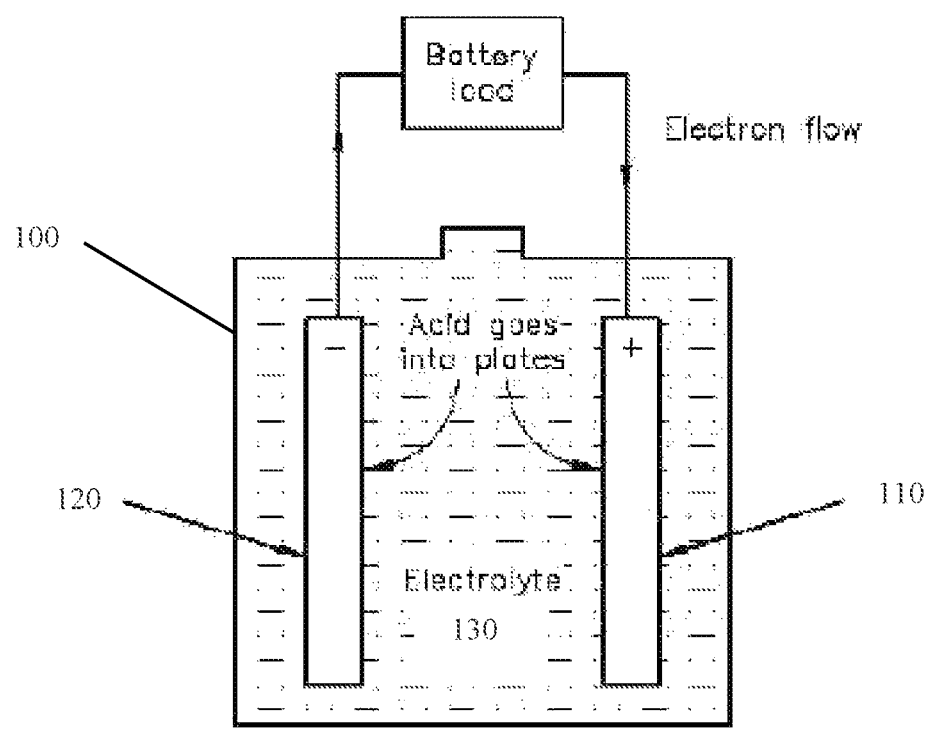
FIG. 1 illustrates an arrangement for a PbOrg battery.

Refer now to the drawings wherein depicted elements are not necessarily shown to scale and wherein like or similar elements are designated by the same reference numeral through the several views.

Referring to the drawings in general, it will be understood that the illustrations are for the purpose of describing particular implementations of the disclosure and are not intended to be limiting thereto. While most of the terms used herein will be recognizable to those of ordinary skill in the art, it should be understood that when not explicitly defined, terms should be interpreted as adopting a meaning presently accepted by those of ordinary skill in the art.

It is to be understood that both the foregoing general description and the following detailed description are exemplary and explanatory only, and are not restrictive of the invention, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

Lead-organic (PbOrg) batteries with high charge acceptance and improved electrodes are discussed further herein. FIG. 1 illustrates an arrangement for a PbOrg battery 100. The PbOrg battery 100 may provide positive 110 and negative 120 electrodes in an electrolyte 130. The positive electrode may be formed from any suitable material, such as, but not limited to, lead, lead sulfate, and lead oxide, the valence of lead in these compounds may range from 0 to +4. The electrolyte may be any suitable electrolyte material, such as, but not limited to, any suitable acid or aqueous sulfuric acid with a concentration of 0.01-10.0 M. In some embodiments, the electrolyte may have a pH value equal to or lower than 2 (pH≤2). In some embodiments, the electrolyte material may be a solid-state electrolyte. As a result, the entirety of the battery would be comprised of materials that are solid-state, and as such, the battery may be referred to as a solid-state battery.

Figure 2:
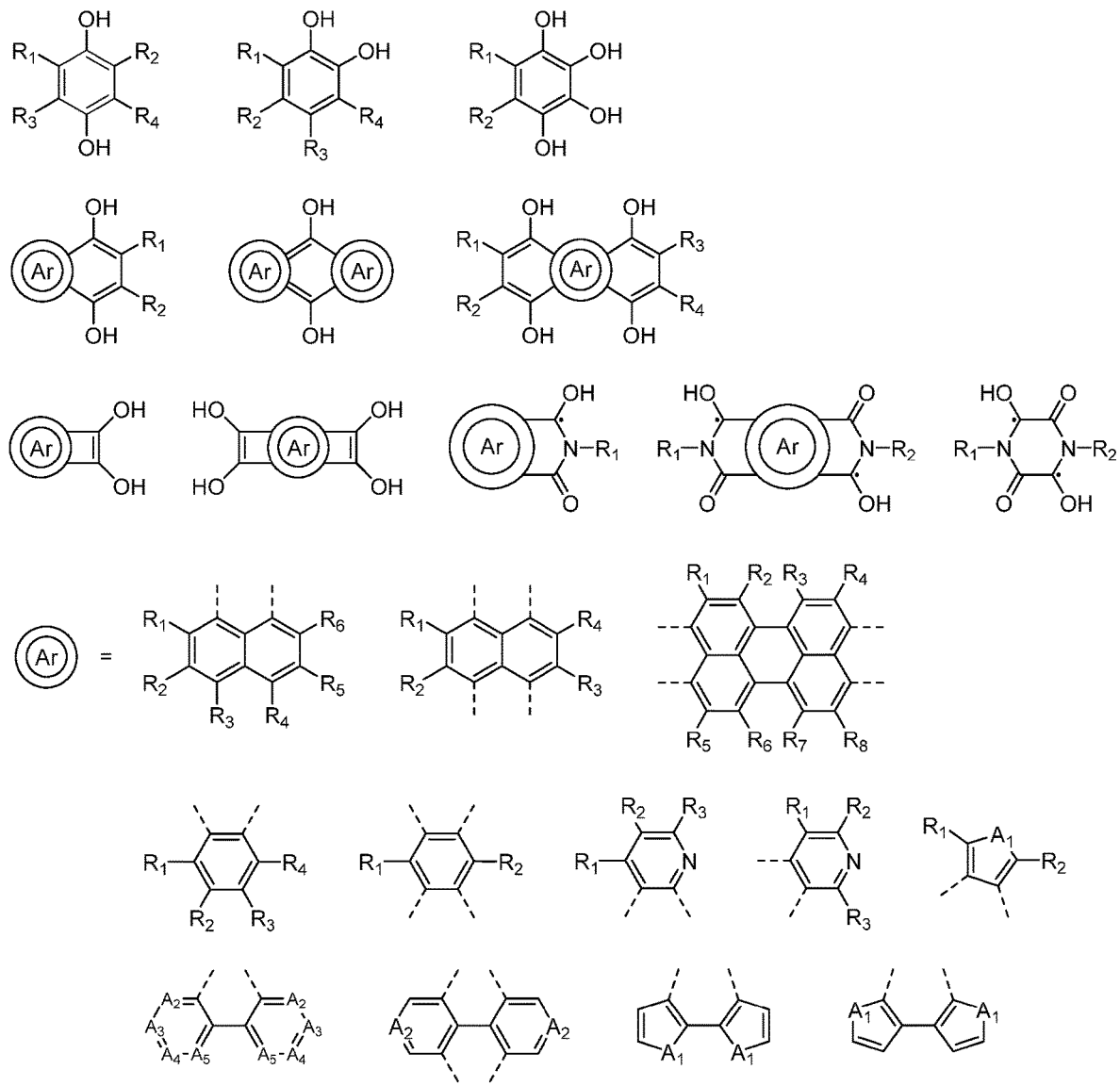
FIG. 2 shows the structure of the reduced form of organic materials that can be used as the electrode materials for the disclosed PbOrg battery.
Figure 3:
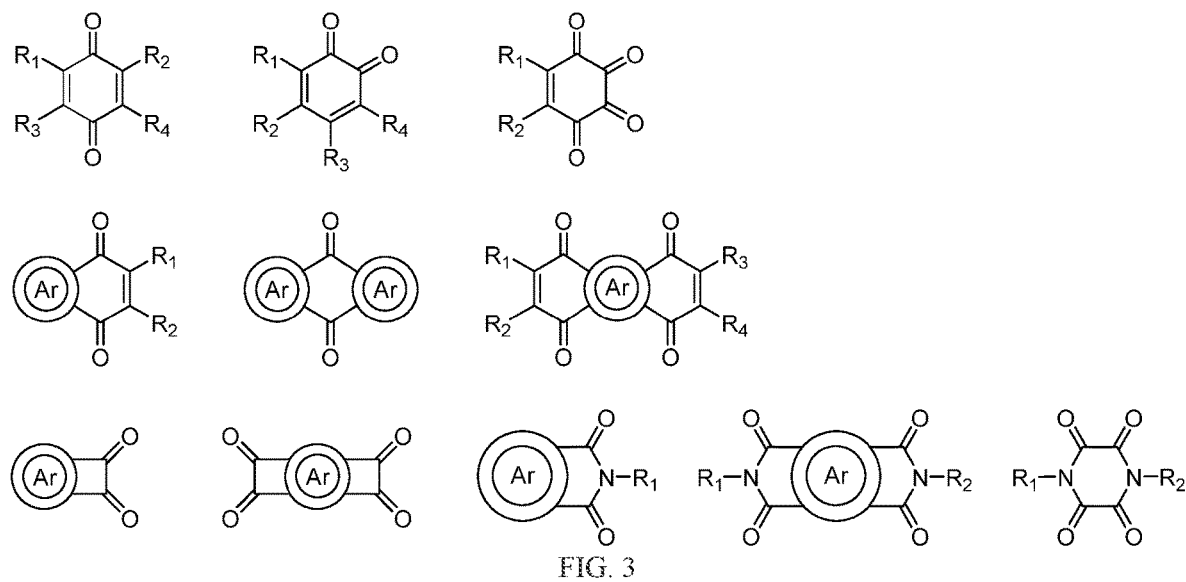
FIG. 3 shows the structure of the oxidized form of organic materials that can be used as the electrode materials for the disclosed PbOrg battery.
Figure 4:
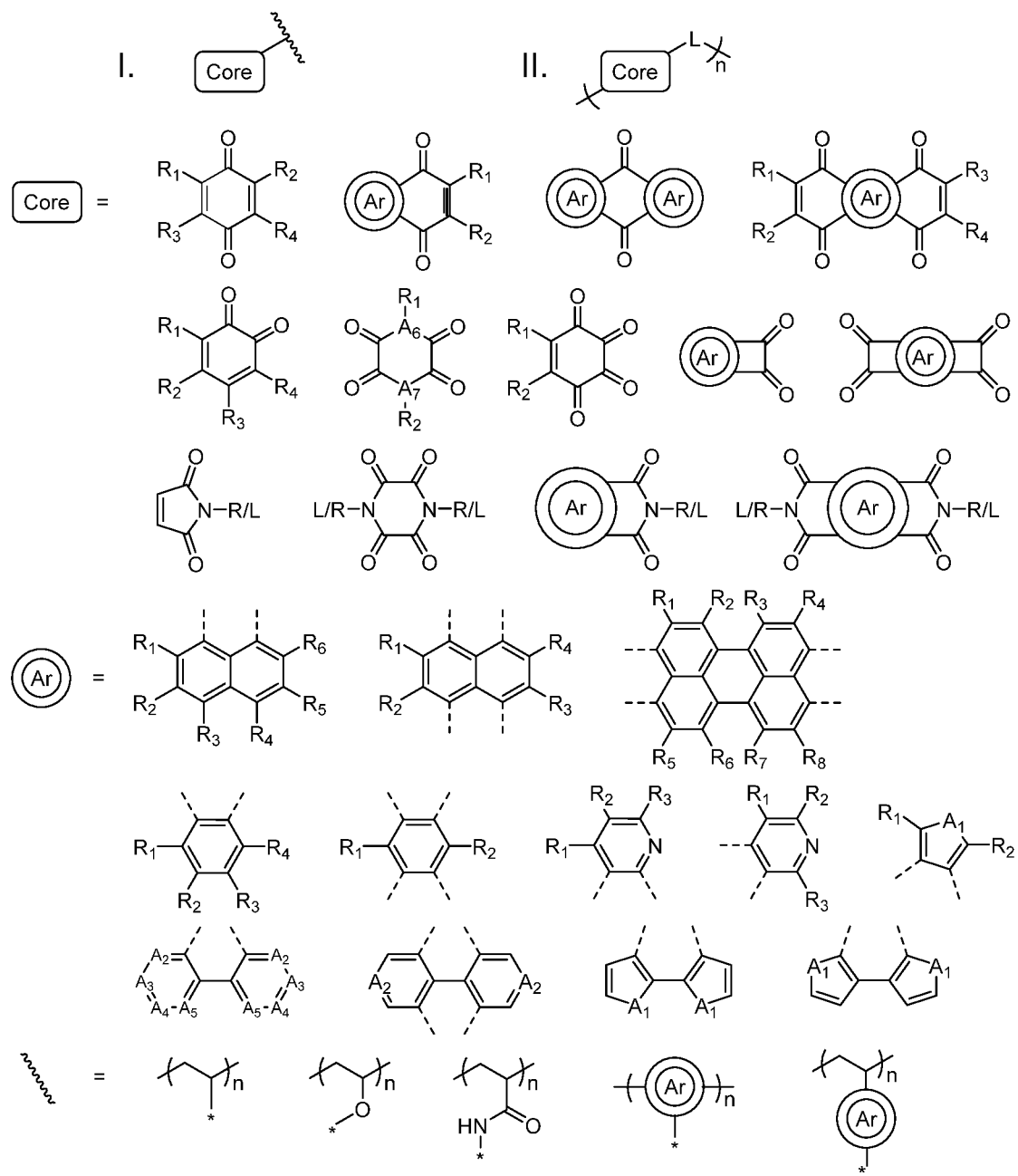
FIG. 4 shows the structure of organic polymers that can be used as the electrode materials for lead-polymer batteries.

FIGS. 2-4 illustrate representative molecular compounds or structures of suitable electrode materials for a PbOrg battery. In some embodiments, the negative electrode of the PbOrg battery may have a lead content of 0-10 wt %. The PbOrg battery may provide negative electrodes that include at least one organic compound or organic material. As a nonlimiting example the organic compound may be selected from the compounds shown in FIG. 2. Generally, these organic materials comprise C—O—H groups in their reduced/charged state (shown in FIG. 2).

Nonlimiting embodiments of a first set of organic materials that are suitable for a negative electrode are discussed herein. In some embodiments, the organic material comprises at least one cyclic substructure with at least one hydroxyl group. In some embodiments, the organic material may be a bicyclic or multi-cyclic compound with at least one hydroxyl group. In some embodiments, the cyclic substructure may be a five/six-membered ring. The cyclic substructure may be a carbocycle with carbon atoms forming the ring or heterocyclic with both carbon and non-carbon atoms forming the ring. In some embodiments, the organic material may comprise aromatic rings with at least one hydroxyl group. Further, the cyclic substructure may comprise one or more R groups where $R_{1, 2, \ldots 8} = M_x$, $CH_3$, $CH_2CH_3$, $CH_2CH_2CH_3$, $CH(CH_3)_2$, $C(CH_3)_3$, $CHCH_2$, $CCH$, $OM_x$, $OCH_3$, $OCH_2CH_3$, $OCH_2CH_2CH_3$, $OCH(CH_3)_2$, $OC(CH_3)_3$, $NH_2$, $NHCH_3$, $N(CH_3)_2$, $NHCH_2CH_2CH_3$, $NHCH(CH_3)_2$, $NHC(CH_3)_3$. $CN$, $Cl$, $Br$, $I$, $SO_3M_x$, where M=H, Li, Na, K, Mg, Ca, Al, or a mixture of these elements, x=0.33~1. In some embodiments, the cyclic substructure may be fused with one or more aromatic ring systems. In some embodiments, the aromatic ring system may be a single six-/five-membered aromatic ring. Further, the aromatic ring may comprise atoms chosen from C, N, O, or S. In some embodiments, the aromatic ring system may be fused aromatic rings chosen from naphthalene and perylene. In some embodiments, the aromatic ring system may be biaryls comprising two six-/five-membered aromatic rings. Further, the aromatic rings in the biaryl may comprise atoms chosen from C, N, O, or S.

Figure 5:
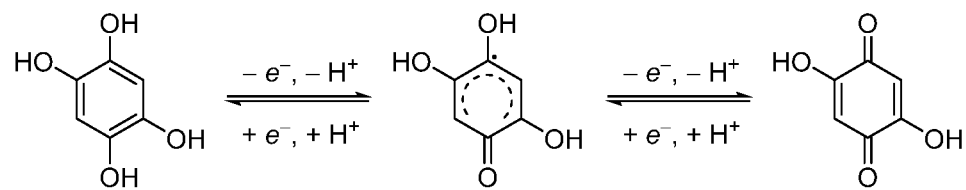
FIG. 5 shows the reductive protonation mechanism in the reversible electrochemical reduction of an organic molecule.

The organic materials, such as those shown in FIG. 2, may have some of their C—O—H groups reversibly transformed into C=O groups in their oxidized/discharged state. FIG. 5 shows a nonlimiting example of the electroactivity of organic compounds arises from this reversible electrochemical redox reaction between hydroxyl and carbonyl groups and the ability of the negatively charged oxygen atoms to coordinate with proton. While the two-step (de)protonation mechanism of the reversible electrochemical reduction of an organic carbonyl compound (e.g. 2,5-dihydroxy-1,4-benzoquinone) is shown, it shall be understood that similar reactions may occur for any organic compounds comprising a cyclic substructure with at least one hydroxyl/carbonyl group in a battery environment. As nonlimiting examples, for the corresponding oxidized forms of compounds shown in FIG. 2, the result of this reaction leads to a second set of organic materials that are shown in FIG. 3 and discussed further below.

Nonlimiting embodiments of the second set of organic materials that are suitable for a negative electrode are described as follows. In some embodiments, the organic material comprises at least one cyclic substructure with at least one hydroxyl group. In some embodiments, the organic molecular material may be a bicyclic or multi-cyclic compound with at least one hydroxyl group. In some embodiments, the cyclic substructure may be a five/six-membered ring. The cyclic substructure may be a carbocycle with carbon atoms forming the ring or heterocyclic with both carbon and non-carbon atoms forming the ring. In some embodiments, the organic molecular material may comprise aromatic rings with at least one hydroxyl group. Further, the cyclic substructure may comprise one or more R groups where $R_{1, 2, \ldots 8} = M_x$, $CH_3$, $CH_2CH_3$, $CH_2CH_2CH_3$, $CH(CH_3)_2$, $C(CH_3)_3$, $CHCH_2$, $CCH$, $OM_x$, $OCH_3$, $OCH_2CH_3$, $OCH_2CH_2CH_3$, $OCH(CH_3)_2$, $OC(CH_3)_3$, $NH_2$, $NHCH_3$, $N(CH_3)_2$, $NHCH_2CH_2CH_3$, $NHCH(CH_3)_2$, $NHC(CH_3)_3$. $CN$, $Cl$, $Br$, $I$, $SO_3M_x$, where M=H, Li, Na, K, Mg, Ca, Al, or a mixture of these elements, x=0.33~1. In some embodiments, the cyclic substructure may be fused with one or more aromatic ring systems. In some embodiments, the aromatic ring system may be a single six-/five-membered aromatic ring. Further, the aromatic ring may be a heterocycle with heteroatoms chosen from N, O, or S. In some embodiments, the aromatic ring system may be fused aromatic rings chosen from naphthalene and perylene. In some embodiments, the aromatic ring system may be biaryls comprising two six-/five-membered aromatic rings. Further, the aromatic ring in the biaryl may comprise atoms chosen from C, N, O, or S.

In some embodiments, the organic material(s) that are suitable for a negative electrode may comprise at least one material selected from the first set or second set discussed above. In some embodiments, the organic materials may comprise a combination of at least one of the organic molecular materials from the first set discussed above and at least one of the organic materials from the second set discussed above. Referring to the exemplary reaction shown in FIG. 5, it shall be understood that the organic material(s) that are suitable for a negative electrode may have both a hydroxyl and carbonyl present in some embodiments, such as in the intermediate state shown. In some embodiments, the organic material may comprise a first cyclic substructure with a hydroxyl group and a second cyclic substructure with a carbonyl group. In some embodiments, the organic material may be a cyclic substructure that comprises both a hydroxyl group and a carbonyl group.

In some embodiments, the organic material(s) for the negative electrode may further include one or more metal ions that can be included in the substitution groups. The resulted compounds are sometimes known as "coordination polymers." For the embodiments of electrode materials discussed above, these coordination polymers have an organometallic polymer structure. The coordination polymer may comprise two or more of the organic molecular material options discussed above (e.g. FIGS. 2-3) linked by metal cation centers, or more specifically metal cations and molecular anions of organic molecules. As a nonlimiting example, cyclic substructures with at least one hydroxyl (C—O—H) group and/or carbonyl (C=O) group, such as the first and second sets of organic materials discussed above, may be connected by metal cations. Further, the metal cations may be chosen from $Li^+$, $Na^+$, $K^+$, $Mg^{2+}$, $Ca^{2+}$, $Al^{3+}$, or a combination thereof. Additionally, some embodiments may have the cyclic substructures connected by metal cations via the R group(s) and/or fused aromatic ring systems. These variations do not change the molecular nature of the active organic molecules.

FIG. 4 illustrates exemplary molecular structures of suitable poly-/oligomer electrode materials in their oxidized/discharged state for a PbOrg battery, particularly lead-polymer battery. Generally, the structural formulas comprise (I) structures where electroactive cores are attached to a poly-/oligomer backbone, or (II) structures where electroactive cores are part of the poly-/oligomer backbone. In some embodiments, the electroactive core may be selected from the organic materials discussed above, such as the nonlimiting examples in FIGS. 2-3. The electroactive core may comprise cyclic substructures with at least one hydroxyl and/or carbonyl group. The electroactive core may be a carbocycle with carbon atoms forming the ring or heterocycle with both carbon and non-carbon atoms forming the ring. The electroactive core may comprise cyclic substructures that are functionalized with R groups and/or fused aromatic ring systems. Nonlimiting examples of the electroactive core are shown in FIG. 4. Note that only the oxidized forms of the active cores are shown in FIG. 4, but it shall be understood that any number of the carbonyl groups in these cores may be reversibly transformed to hydroxyl groups when desired or during battery operation. In some embodiments, the organic material may be a poly-/oligomer, where repeating unit(s) comprise at least one cyclic substructure with at least one hydroxyl group or carbonyl group. Further, the cyclic substructures may be functionalized with at least one R group and/or fused aromatic ring system. With respect to the structural formula (I) the chain comprises any polymer or oligomer backbone. In some embodiments, the polymer backbone is chosen from polyethylene, polypropylene, polystyrene, and polyaryls. Nonlimiting examples of the aryl structures in the polyaryls include benzene, thiophene, pyrrole, pyridine, naphthalene, anthracene, perylene, or a combination thereof. The electroactive cores may be linked to the poly-/oligomer backbone directly or via a linker, such as O atoms, ester bonds, amide bonds, or aryl groups. In structural formula (II), electroactive cores may be either directly connected by covalent bonds or linked by linkers. Linkers may comprise a moiety chosen from the group consisting of C=O, (C=O)-L'-(C=O), NH, NH-L'-NH, O, O-L'-O, S, S-L'-S, $CH_2$, $CH_2$-L'-$CH_2$, $(CH_2)_2$, $(CH_2)_2$-L'-$(CH_2)_2$, 5-6 membered (hetero)aryl, or biaryls with two identical or different 5-6 membered (hetero)aryl groups, where L' may be chosen from $CH_2$, $(CH_2)_2$, $(CH_2)_3$, 5-6 membered (hetero)aryl group, or biaryls with two identical or different 5-6 membered (hetero)aryl groups. Without limitation, "n" indicates the average number of repeating units in the formula. In some embodiments, the average number of repeat units for a poly-/oligomer may be at least 2.

In some embodiments, the organic materials disclosed herein for the negative electrode are characterized by (1) electrochemically reversible conversion between the C—O—H-containing form and C=O-containing form or vice versa, and/or (2) an average reduction potential of 0.6 V or less versus normal hydrogen electrode (NHE) in 4.4 M $H_2SO_4$.

These PbOrg batteries may provide high charge acceptance, such as over-ten-time higher charge acceptance than prior lead acid batteries, and as much as 50% less lead and sulfuric acid than current LABs. Current LABs only allow a C/8 charge rate at room temperature and C/24 at 0° C. Some vehicle manufacturers are adopting start/stop technology to meet new US, European, and/or Chinese requirements for fuel efficiency. In order to do so, LABs will need to provide power for the electrical system when the engine is shut down and then recover charge quickly to allow for repetitive charge/discharge events. Similarly, most renewable energy or energy efficiency projects also have to have a better balance of charge and discharge in order to store energy efficiently when it is available, such as brake energy recovery in vehicles, smoothing wind and solar output, and/or grid stabilization in regulatory/ancillary service. In some embodiments, the charge rate of PbOrg batteries may be 1C or greater. As a nonlimiting example, the PbOrg batteries may be charged from any state-of-charge to 80% charged within 1 hour or shorter. The high charge acceptance would immediately address issues for lead acid battery use in new start/stop and micro hybrid vehicles and would make these batteries suitable for a wide range of new applications such as hybrid vehicles and buses, light rail, and/or grid storage applications. To the best of our knowledge, organic materials have not yet been examined in lead-acid batteries. In some embodiments, the specific capacity of these PbOrg batteries may be 30 mAh/g or greater. Because the negative electrode in the improved LABs batteries does not contain lead and not consume sulfate ions, the batteries reduce the use of lead and sulfuric acid by 50% of weight. These PbOrg batteries will rejuvenate the lead-acid battery industry by enabling high charge acceptance originated from polymeric active materials.

Experimental examples are discussed below to illustrate the ability of organic materials to be potentially sustainable, low-cost, and high-energy electrode materials.

The following examples are included to demonstrate particular aspects of the present disclosure. It should be appreciated by those of ordinary skill in the art that the methods described in the examples that follow merely represent illustrative embodiments of the disclosure. Those of ordinary skill in the art should, in light of the present disclosure, appreciate that many changes can be made in the specific embodiments described and still obtain a like or similar result without departing from the spirit and scope of the present disclosure.

Figure 6:
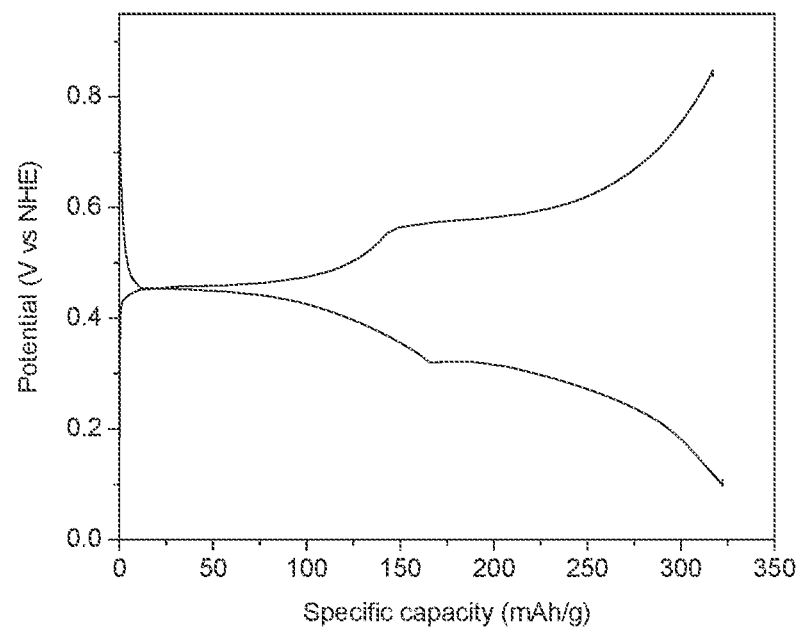
FIG. 6 shows the voltage profile of an organic molecule, 2,5-dihydroxy-1,4-benzoquinone, in an acid electrolyte.
Figure 7:
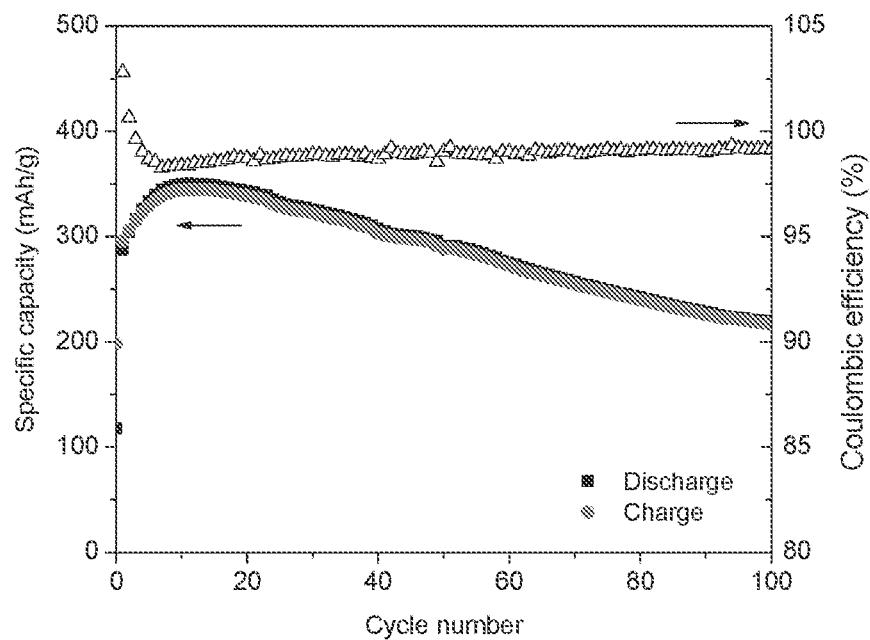
FIG. 7 shows the cycling performance of 2,5-dihydroxy-1,4-benzoquinone in an acid electrolyte.
Figure 8:
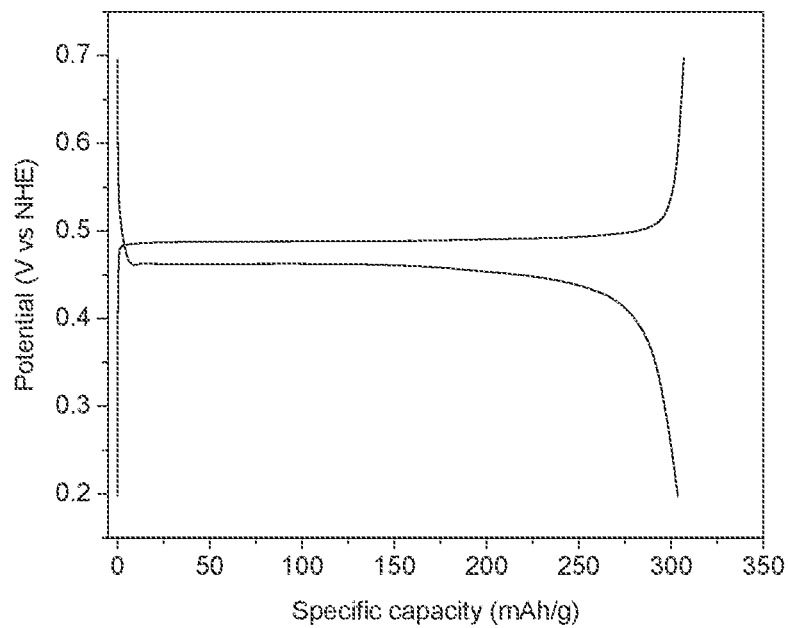
FIG. 8 shows the voltage profile of an organic molecule, 2,5-dimethoxy-1,4-benzoquinone, in an acid electrolyte.
Figure 9:
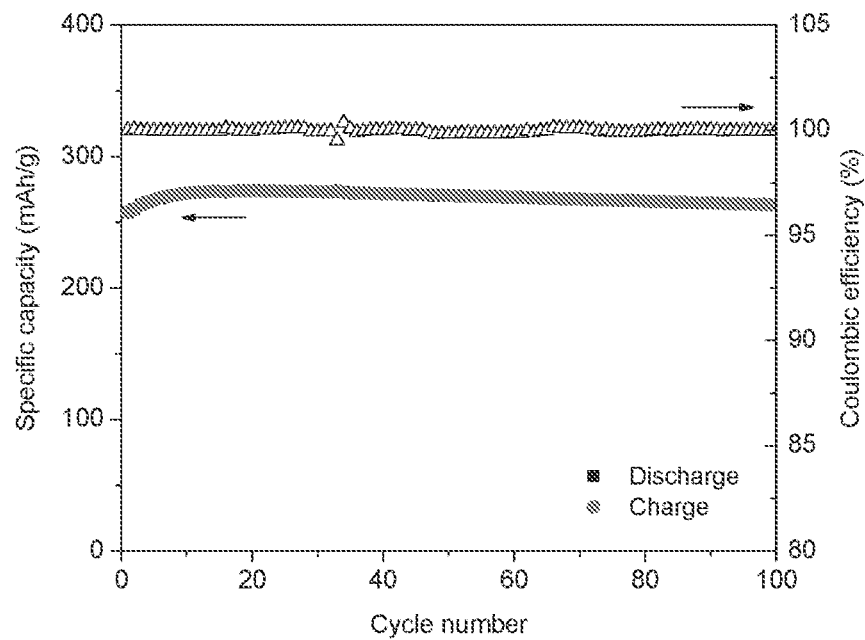
FIG. 9 shows the cycling performance of 2,5-dimethoxy-1,4-benzoquinone in an acid electrolyte.
Figure 10:
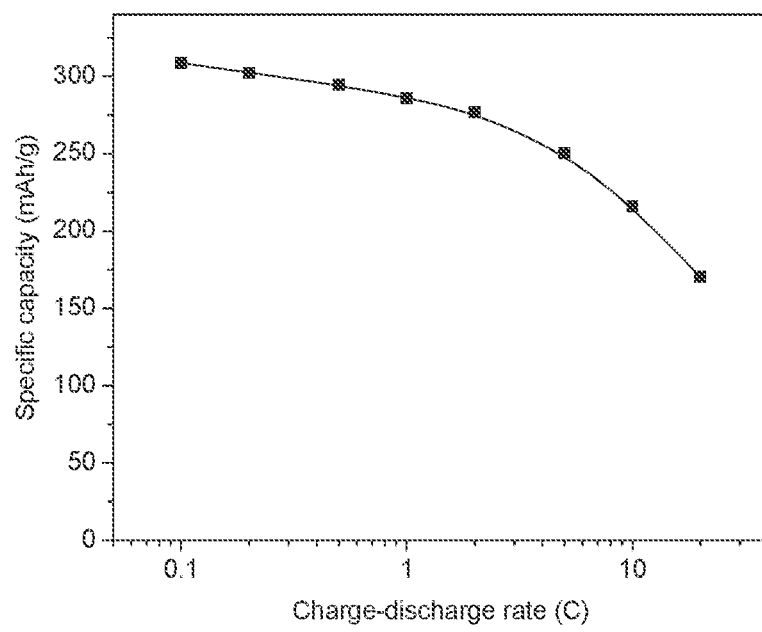
FIG. 10 shows the rate performance of 2,5-dimethoxy-1,4-benzoquinone in an acid electrolyte.
Figure 11:
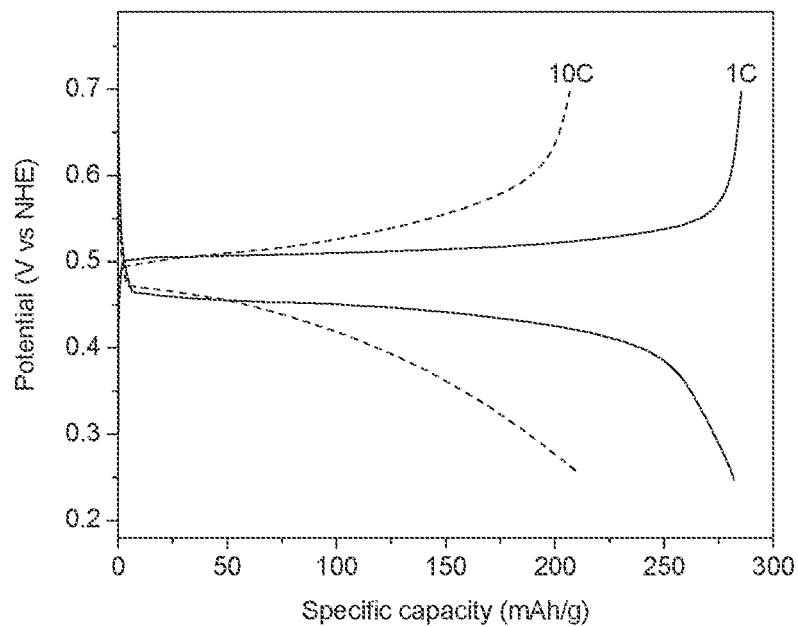
FIG. 11 shows the voltage profile of 2,5-dimethoxy-1,4-benzoquinone at high current densities.
Figure 12:
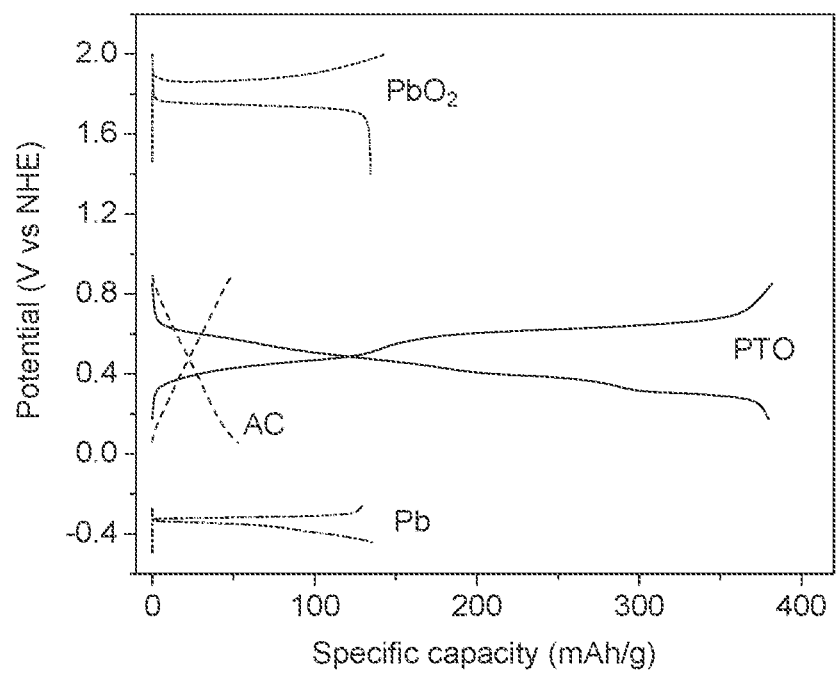
FIG. 12 compares the voltage profile of $PbO_2$, Pb, activated carbon, and an organic molecule, pyrene-4,5,9,10-tetraone, in a sulfuric acid electrolyte.

Organic compounds are shown to be reliable and low-cost negative electrode materials that can be used to replace lead in an LAB. This (de)protonation reaction is an intrinsically fast and highly reversible process. Organic compounds that are potentially sustainable, low-cost, and high-capacity (200-500 mAh/g) are very attractive electrode materials. FIGS. 6&7 show the electrochemical performance of a cell based on 2,5-dihydroxy-1,4-benzoquinone tested in a 4.4 M sulfuric acid electrolyte. A specific capacity of up to 350 mAh/g is obtained, which is 91% of the theoretical capacity based on a two-electron transfer reaction, confirming the proposed mechanism. FIG. 8-11 show the electrochemical performance of 2,5-dimethoxy-1,4-benzoquinone. The average discharge voltage is 100 mV lower than that of 2,5-dihydroxy-1,4-benzoquinone, which will be translated into 100 mV increase of battery voltage. The capacity retention is 96% after 100 cycles. When charged at a constant rate of 1C from a completely discharged state, 93% of the maximum capacity is obtained. Even at a very high charging rate of 10C, 67% of the maximum capacity can be obtained with minimal loss (10 mV) in voltage. FIG. 12 compares the voltage profile of $PbO_2$, Pb, activated carbon, and pyrene-4,5,9,10-tetraone in a sulfuric acid electrolyte. The specific capacity of the pyrene-4,5,9,10-tetraone is 382 mAh/g, which is more than five times of that of activated carbon and two times higher than that of Pb. The voltage profile for PTO is also less sloping than that for activated carbon.

Figure 13:
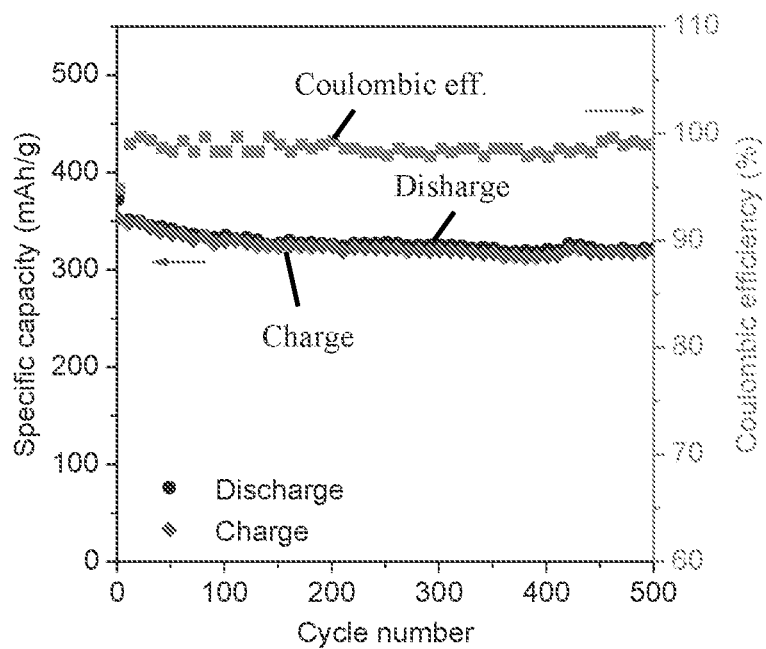
FIG. 13 shows the cycling performance of pyrene-4,5,9,10-tetraone in an acid electrolyte.
Figure 14:
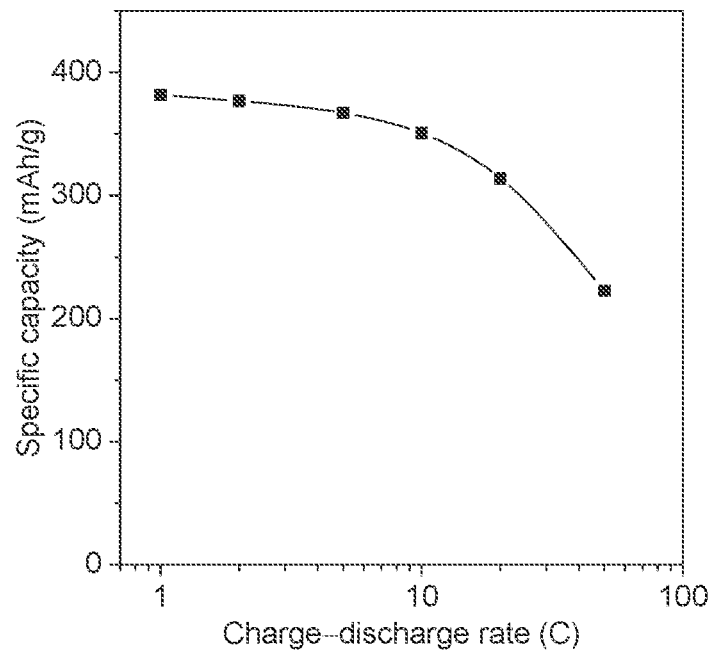
FIG. 14 shows the rate performance of pyrene-4,5,9,10-tetraone in an acid electrolyte.
Figure 15:
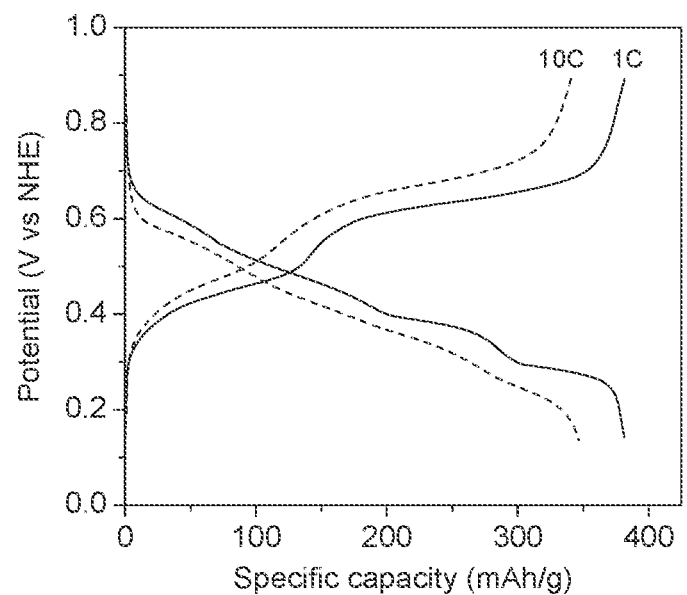
FIG. 15 shows the voltage profile of pyrene-4,5,9,10-tetraone at high current densities.
Figure 16:
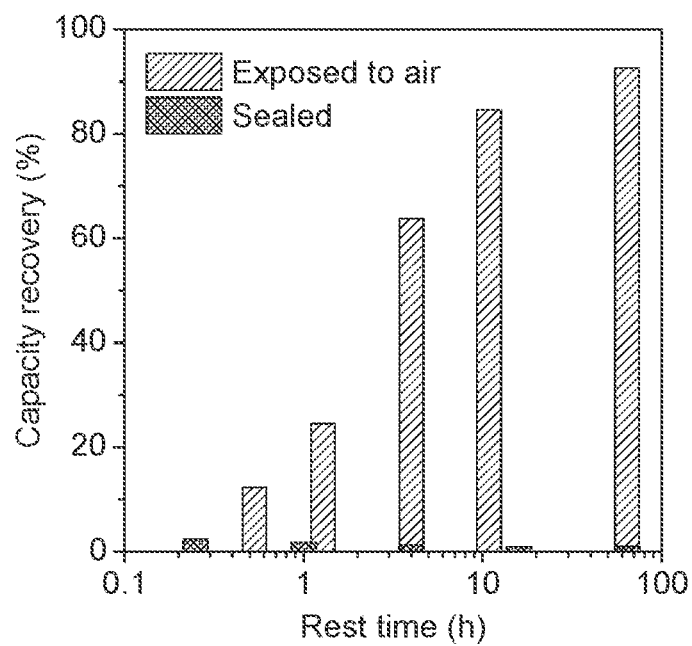
FIG. 16 shows the capacity recovery of pyrene-4,5,9,10-tetraone when exposed to air.

FIG. 13 shows the capacity retention of pyrene-4,5,9,10-tetraone in an acid electrolyte is 90% after 500 cycles. FIG. 14 shows 92% of the capacity of pyrene-4,5,9,10-tetraone is recovered when galvanostatically charged at 10C. FIG. 15 shows the voltage decrease for pyrene-4,5,9,10-tetraone when increasing the charging rate from 1C to 10C is 20 mV. A fully charged pyrene-4,5,9,10-tetraone electrode quickly recover capacity when exposed to air (FIG. 16). This capability indicates the organic compound can be reversibly oxidized by oxygen, hence enabling oxygen cycle within a typical lead-acid battery.

In some embodiments, a method for fabricating polymer materials that are suitable for use as an electrode in a PbOrg battery includes processing a solution that includes pyrene to form poly[pyrene-4,5,9,10-tetraone (PTO)]. The PTO may then be processed to form $PTO(NO_2)_2$, which is then processed to form $PTO(NH_2)_2$. The $PTO(NH_2)_2$ may be processed to form $P(PTO-C_4)$ that is suitable to be utilized as an electrode in a PbOrg battery.

Figure 17:
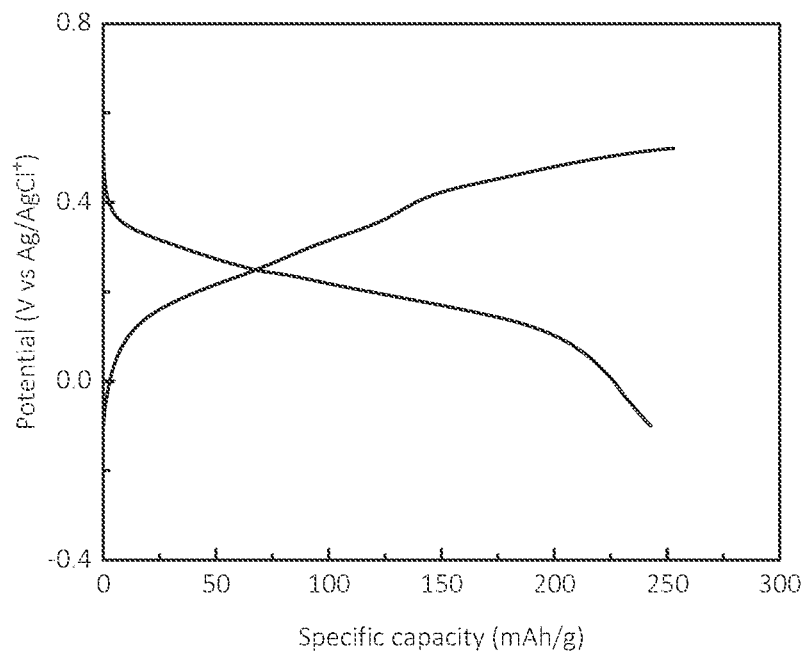
FIG. 17 shows the voltage profile of a polymer anode, poly[pyrene-4,5,9,10-tetraone], in an acid electrolyte.
Figure 18:
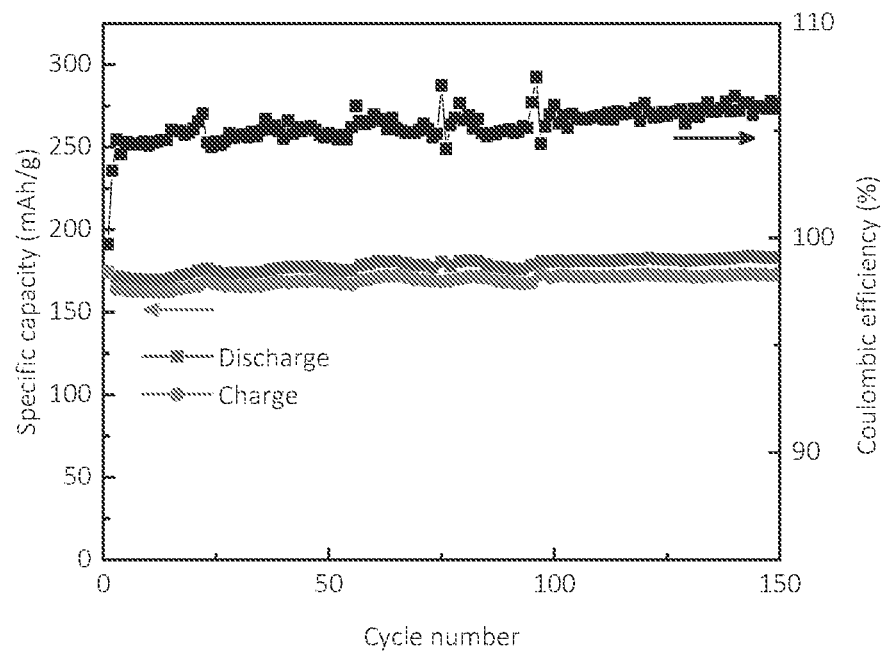
FIG. 18 shows the cycling performance of poly[pyrene-4,5,9,10-tetraone] in an acid electrolyte.
Figure 19:
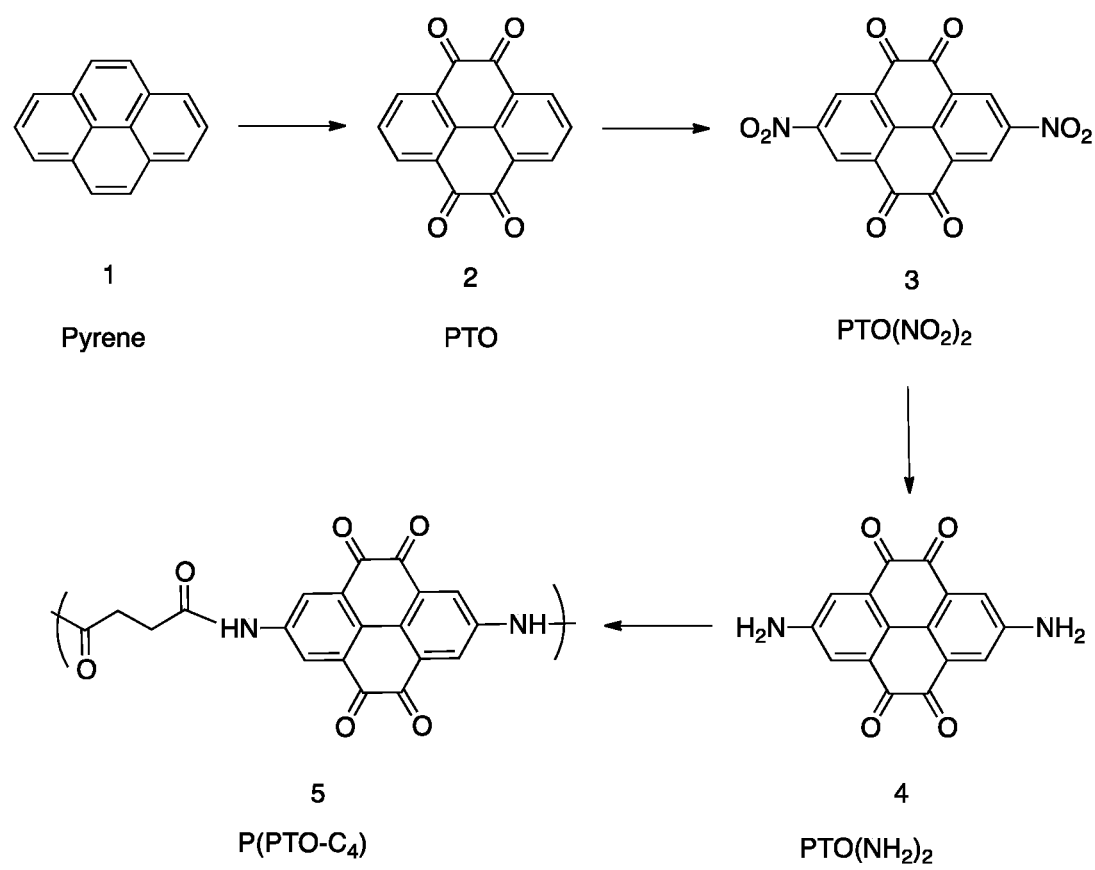
FIG. 19 shows a synthesis route for poly[pyrene-4,5,9, 10-tetraone].

Organic polymers are shown to be reliable and low-cost negative electrode materials that can be used to replace lead in a LAB. FIGS. 17&18 shows electrochemical performance of poly[pyrene-4,5,9,10-tetraone]. A specific capacity of 250 mAh/g is found, which is four times of that of activated carbon and double of that of Pb. After 150 cycles, no sign of capacity decay can be observed. As a nonlimiting example, in some embodiments, the organic polymer for an electrode may be $P(PTO-C_4)$. A nonlimiting embodiment of the synthesis route of $P(PTO-C_4)$ that can be used in the anode is shown in FIG. 19.

As micro hybrid and stop/start technologies require higher charge acceptance, lead acid battery technology may soon be replaced. The technology discussed herein would be a direct replacement for the negative lead electrode currently used in existing lead acid battery manufacturing. This technology will solve both the charge acceptance problem of current LABs and also the low energy and sloping voltage profile of PbC batteries. Finally, this technology may be easily integrated into existing LAB manufacturing processes, which will dramatically reduce time-to-market and cost to scale-up this technology.

Embodiments described herein are included to demonstrate particular aspects of the present disclosure. It should be appreciated by those of skill in the art that the embodiments described herein merely represent exemplary embodiments of the disclosure. Those of ordinary skill in the art should, in light of the present disclosure, appreciate that many changes can be made in the specific embodiments described and still obtain a like or similar result without departing from the spirit and scope of the present disclosure. From the foregoing description, one of ordinary skill in the art can easily ascertain the essential characteristics of this disclosure, and without departing from the spirit and scope thereof, can make various changes and modifications to adapt the disclosure to various usages and conditions. The embodiments described hereinabove are meant to be illustrative only and should not be taken as limiting of the scope of the disclosure.

What is claimed is:

1. A lead acid battery comprising:
   a first electrode, wherein the first electrode is a lead compound;
   an electrolyte, wherein the electrolyte has a pH value equal to or lower than 2; and
   a second electrode comprising at least one organic material, wherein the organic material is a molecular material and comprises at least one cyclic substructure with at least one hydroxyl (C—O—H) group and/or carbonyl (C=O) group, the second electrode has a lead content of 0-10 wt %, the second electrode has a reduction potential of 0.6 V or less versus a normal hydrogen electrode (NHE) in 4.4 M $H_2SO_4$, and wherein further the organic material undergoes a reversible electrochemical redox reaction between hydroxyl and carbonyl groups during charging or discharging.

2. The battery of claim 1, wherein the second electrode is electrochemically reversible between a C—O—H-containing form and a C=O-containing form or vice versa.

3. The battery of claim 1, wherein the C atoms in the at least one hydroxyl (C—O—H) group and/or carbonyl (C=O) group are part of a cyclic substructure.

4. The battery of claim 1, wherein the cyclic substructure is a carbocycle with carbon atoms forming a ring.

5. The battery of claim 1, wherein the cyclic substructure is a heterocycle with both carbon and non-carbon atoms forming a ring.

6. The battery of claim 1, wherein the cyclic substructure is an aromatic ring.

7. The battery of claim 1, wherein the cyclic substructure further comprises one or more R groups where $R_{1, 2, \ldots 8} = M_x$, $CH_3$, $CH_2CH_3$, $CH_2CH_2CH_3$, $CH(CH_3)_2$, $C(CH_3)_3$, $CHCH_2$, $CCH$, $OM_x$, $OCH_3$, $OCH_2CH_3$, $OCH_2CH_2CH_3$, $OCH(CH_3)_2$, $OC(CH_3)_3$, $NH_2$, $NHCH_3$, $N(CH_3)_2$, $NHCH_2CH_2CH_3$, $NHCH(CH_3)_2$, $NHC(CH_3)_3$, CN, Cl, Br, I, $SO_3M_x$, where M=H, Li, Na, K, Mg, Ca, Al, or a mixture of these elements, x=0.33~1.

8. The battery of claim 1, wherein the cyclic substructure is fused with one or more aromatic ring systems.

9. The battery of claim 8, wherein the aromatic ring system is a single six-/five-membered aromatic ring.

10. The battery of claim 9, wherein the single six-/five-membered aromatic ring is a heterocycle with one heteroatom chosen from N, O, or S.

11. The battery of claim 8, wherein the aromatic ring system comprises fused aromatic rings chosen from naphthalene and perylene.

12. The battery of claim 8, wherein the aromatic ring system is a biaryl comprising two six-/five-membered aromatic rings.

13. The battery of claim 12, wherein at least one aromatic ring in the biaryl is a heterocycle with at least one heteroatom chosen from N, O, or S.

14. The battery of claim 8, wherein the aromatic ring system further comprises one or more R groups where $R_{1, 2, \ldots 8}$=$M_x$, $CH_3$, $CH_2CH_3$, $CH_2CH_2CH_3$, $CH(CH_3)_2$, $C(CH_3)_3$, $CHCH_2$, CCH, $OM_x$, $OCH_3$, $OCH_2CH_3$, $OCH_2CH_2CH_3$, $OCH(CH_3)_2$, $OC(CH_3)_3$, $NH_2$, $NHCH_3$, $N(CH_3)_2$, $NHCH_2CH_2CH_3$, $NHCH(CH_3)_2$, $NHC(CH_3)_3$, CN, Cl, Br, I, $SO_3M_x$, where M=H, Li, Na, K, Mg, Ca, Al, or a mixture of these elements, x=0.33~1.

15. The battery of claim 1, wherein the organic material is a molecular compound.

16. The battery of claim 1, wherein the at least one organic material comprises a first cyclic substructure with at least one hydroxyl group and a second cyclic substructure with at least one carbonyl group.

17. The battery of claim 1, wherein the at least one cyclic substructure comprises at least one hydroxyl group and at least one carbonyl group simultaneously.

18. The battery of claim 1, wherein the second electrode is charged from any state-of-charge to 80% charged within 1 hour or shorter.

19. The battery of claim 1, wherein a specific capacity of the battery is 30 mAh/g or greater.

20. The battery of claim 1, wherein the organic material is selected from:

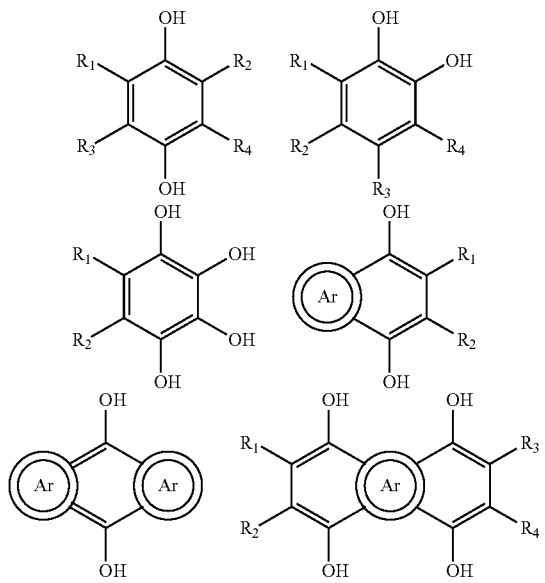

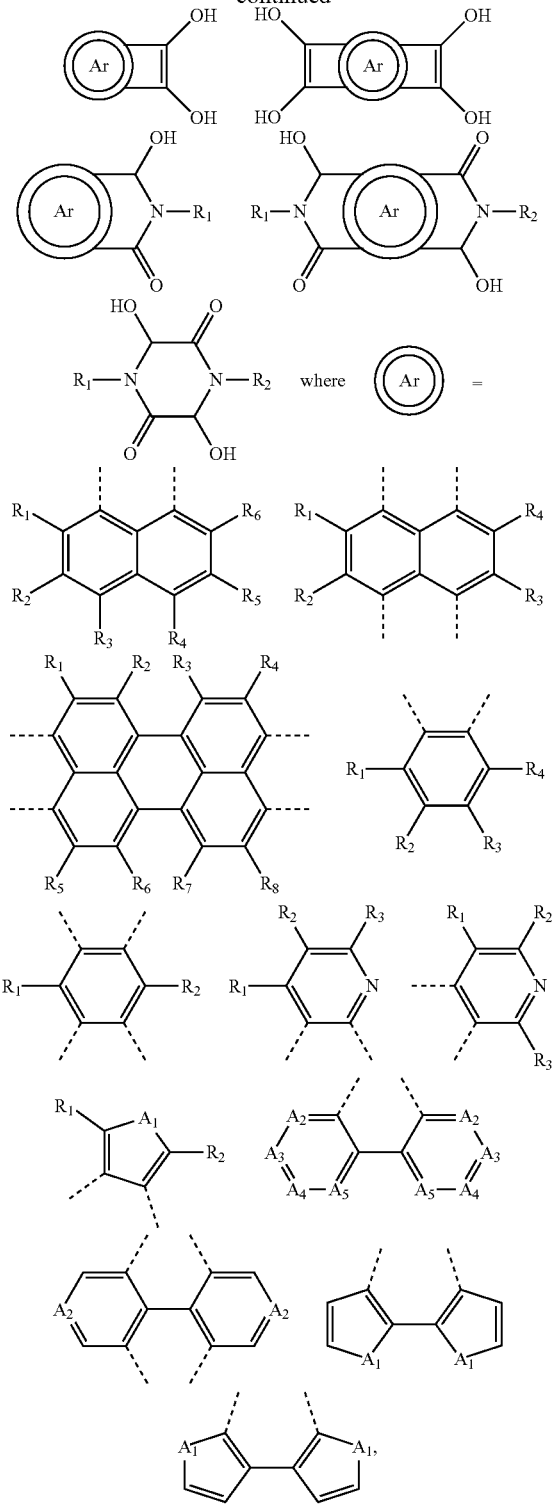

$R_{1, 2, \ldots 8}$=$M_x$, $CH_3$, $CH_2CH_3$, $CH_2CH_2CH_3$, $CH(CH_3)_2$, $C(CH_3)_3$, $CHCH_2$, CCH, $OM_x$, $OCH_3$, $OCH_2CH_3$, $OCH_2CH_2CH_3$, $OCH(CH_3)_2$, $OC(CH_3)_3$, $NH_2$, $NHCH_3$, $N(CH_3)_2$, $NHCH_2CH_2CH_3$, $NHCH(CH_3)_2$, $NHC(CH_3)_3$, CN, Cl, Br, I, $SO_3M_x$, M=H, Li, Na, K, Mg, Ca, Al, or a mixture of these elements,

X=0.33-1, $A_1$=$NR_1$, O, S, and
$A_{2, 3, 4, 5}$=C, N.
21. The battery of claim 1, wherein the organic material is selected from:
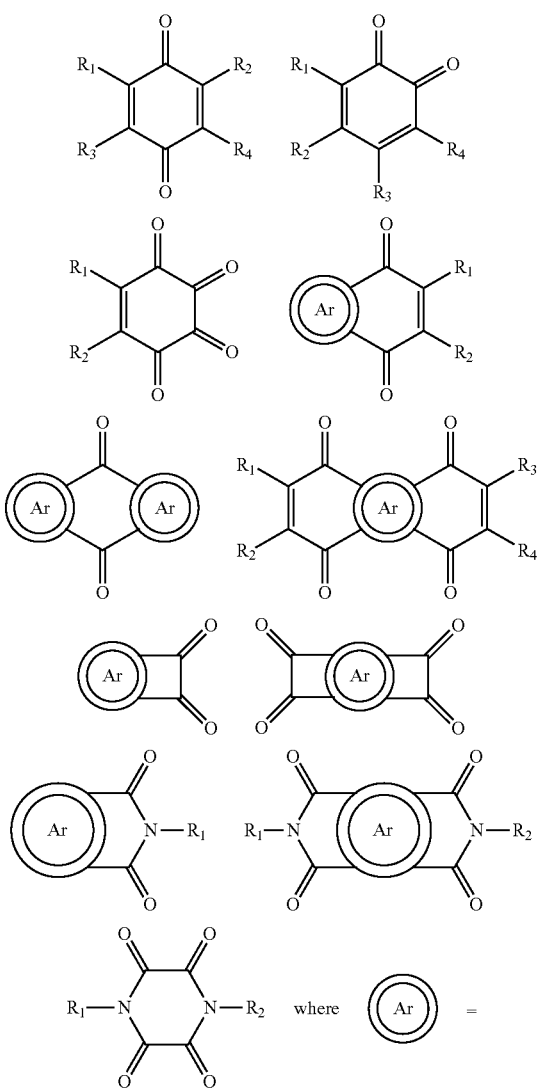
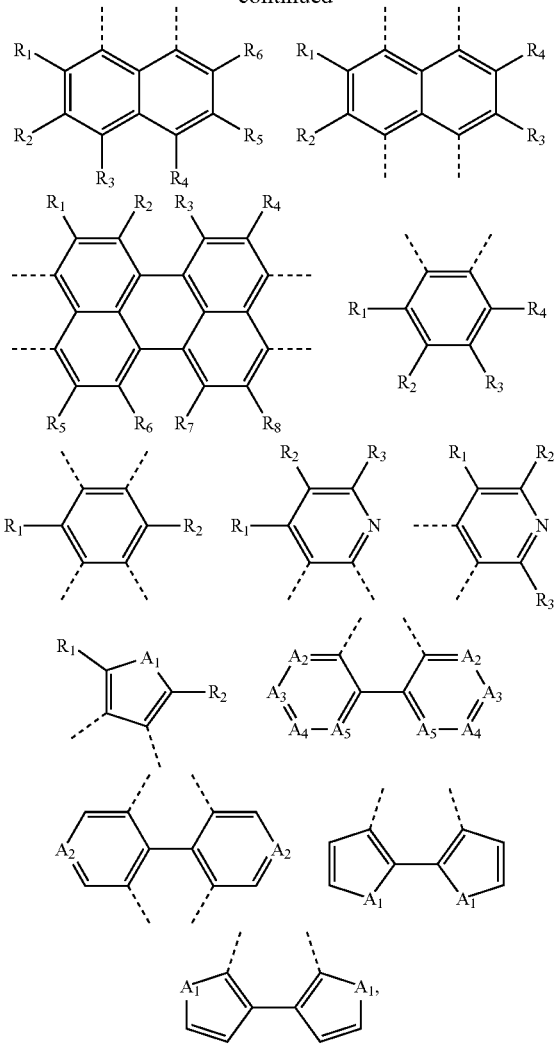
and
$R_{1, 2, 3, 4}$=$M_x$, $CH_3$, $CH_2CH_3$, $CH_2CH_2CH_3$, $CH(CH_3)_2$, $C(CH_3)_3$, $CHCH_2$, $CCH$, $OM_x$, $OCH_3$, $OCH_2CH_3$, $OCH_2CH_2CH_3$, $OCH(CH_3)_2$, $OC(CH_3)_3$, $NH_2$, $NHCH_3$, $N(CH_3)_2$, $NHCH_2CH_2CH_3$, $NHCH(CH_3)_2$, $NHC(CH_3)_3$, CN, Cl, Br, I, $SO_3M_x$.
* * * * *